Sept. 25, 1973  J. S. SMATKO  3,761,315
NON-GASSING BATTERY SEPARATOR AND METHOD OF PRODUCTION
Filed Nov. 16, 1970
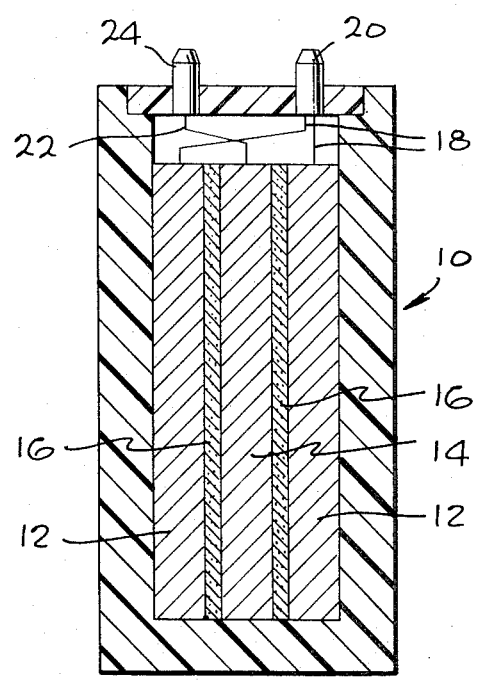
JOSEPH S. SMATKO
INVENTOR.
BY *Mat Belden*
ATTORNEY

United States Patent Office 3,761,315
Patented Sept. 25, 1973

3,761,315
NON-GASSING BATTERY SEPARATOR AND METHOD OF PRODUCTION
Joseph S. Smatko, Santa Barbara, Calif., assignor to McDonnell Douglas Corporation, Santa Monica, Calif.
Filed Nov. 16, 1970, Ser. No. 89,866
Int. Cl. H01m 35/02
U.S. Cl. 136—20                          20 Claims

ABSTRACT OF THE DISCLOSURE

Production of inorganic porous sintered battery separator essentially eliminating formation of gas when in contact with a zinc electrode, and also having a dendrite formation inhibiting effect on such zinc electrode, permitting long cycle life of a high energy density battery such as a silver-zinc or nickel-zinc battery, and providing a sealed battery, produced according to one embodiment by initially firing a mixture of magnesium-bearing material, e.g., MgO, a substance selected from the group consisting of zinc-bearing material such as ZnO and manganese-bearing material such as MnO, lead-bearing material such as PbO, and silica ($SiO_2$), at temperature at the range of about 1,100 to about 1,400° C. to produce a magnesium silicate-zinc silicate, or magnesium silicate-manganese silicate composition, in each case containing combined lead, e.g., as lead silicate, granulating and compacting said composition into plaques, and sintering said compacted plaques at temperature ranging from about 1,000 to about 1,300° C., to produce porous sintered separator members, in the form of a sintered solid solution of magnesium silicate, zinc silicate or manganese silicate, and combined lead, e.g., in the form of lead silicate, having good transverse strength and low resistivity.

---

This invention relates to batteries, particularly high energy density batteries and is especially concerned with the production of improved inorganic members or separators for use in such batteries, especially a high energy density battery containing a zinc electrode, such separators being free from any tendency to cause gassing when in contact with a zinc electrode, thereby permitting production of hermetically sealed batteries of this type having extended life, which can operate as a secondary battery over a large number of charge-discharge cycles efficiently; with novel procedure for producing such separators; and with improved battery construction embodying such improved separators.

Batteries are an important source of energy storage for power generation. An important type of battery particularly suited for such applications are the high energy density alkaline electrolyte cells such as the silver-zinc, zinc-air and nickel-zinc batteries. High energy density batteries are generally battery systems which have a substantially higher energy per unit of weight than conventional, e.g., lead, storage batteries. In addition to important airborne applications, such high energy density batteries have many other applications such as in portable tools and appliances, television, radio and record players, engine starting, portable X-ray units and the like.

In high energy density batteries such as silver-zinc and nickel-zinc batteries, the electrodes are placed adjacent opposite sides of a membrane or separator which performs the function of retaining electrolyte, separating the electrodes, and permitting transfer of electrolyte ions while inhibiting migration of electrode ions. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

One form of particularly useful inorganic separator for such high energy density batteries, such as silver-zinc batteries is disclosed in Pat. No. 3,446,668. Such inorganic separator is in the form of a sintered porous member composed of magnesium silicate and iron silicate. According to the patent, such separators in addition to being formed from synthetic mixtures of iron-bearing material, magnesium-bearing material, and silica, can be formed from the naturally occurring mineral olivine, a magnesium-iron silicate.

Although the magnesium silicate-iron silicate separator of the above patent has proved successful in high energy density batteries, including silver-zinc batteries when such batteries or cells are vented, it has been found from experience that cells incorporating such separators and containing a zinc electrode, eventually develop gas. Thus, when non-vented or sealed cells such as a sealed silver-zinc battery containing the above noted magnesium silicate-iron silicate separator is cycled, such batteries eventually develop gas, although such cells can be cycled from about 12 to about 80 cycles on shallow cycling regimes without excessive pressure rise. However, thereafter such cells gas significantly during overcharge, and on standing, and in due course of time the pressure rise is sufficiently great to present the danger of rupture of the battery case. Analysis of the gas generated in such batteries shows the major component to be hydrogen.

Tests have been devised to determine the gassing potential of the various cell components. One such test is based on mixing a predetermined weight of test material, such as particulate sintered magnesium silicate-iron silicate separator material produced according to the above patent, with a pre-established amount of zinc powder, compressing the mixture and then exposing the compressed pellet to about 30% KOH solution. The gas produced is collected and measured over a certain time period, the amount of gas collected providing a measure of the degree of activity toward gassing of the above noted separator material in contact with the zinc. This test showed that the magnesium silicate-iron silicate separator material of the above patent is very prone to cause gassing when in contact with zinc.

Attempts were made to de-activate the gassing sites with sulfide treatment or with quinoline, but these failed to yield a long term and satisfactory solution to the gassing problem of the magnesium silicate-iron silicate separator material. Other attempts involved the application of a thin coating of a non-gassing ceramic material such as zirconia on the sintered magnesium silicate-iron silicate, or olivine, separator member of the above patent. At best, this latter technique served only to delay to a minor extent the onset of significant gassing when such coated separator was used in a silver-zinc cell, but did not provide a satisfactory solution to the problem.

The above patent also discloses an inorganic separator in the form of a sintered porous member composed of magnesium silicate and zinc silicate. Although such separator is substantially less gassing when employed with a zinc electrode in a battery, as compared to the above noted magnesium silicate-iron silicate separator of such patent, such magnesium silicate-zinc silicate separator when employed in a high energy density battery containing alkali electrolyte, has substantially shorter cycle life as compared to the magnesium silicate-iron silicate separator of the patent, because of the large amount of zinc generally present in such separators, and after a period of cycling same, significant zinc dissolves in the alkali, weakening the separator and causing deterioration thereof.

In accordance with the present invention, it has been found that porous members or membranes comprising a sintered composition of magnesium silicate, a substance selected from the group consisting of zinc silicate and manganese silicate, and combined lead, e.g., as lead silicate, provide separators which not only are non-gassing when employed with a zinc electrode, but actually even inhibit the normally slight gassing tendency of zinc itself, as will be pointed out more clearly hereinafter. In addition, such separators have high alkali resistance and provide highly extended battery cycle life. Further, such separators have desirable porosity properties, low resistivity, and zinc dendrite inhibiting properties in the presence of zinc. Finally, such separators have a high strength or modulus of rupture.

Briefly, the process of the present invention for producing a non-gassing separator when employed with a zinc electrode, and having high resistance to alkali and high strength, is produced by a process which comprises sintering a compacted composition of magnesium silicate and a substance selected from the group consisting of zinc silicate and manganese silicate, and containing combined lead, at temperature ranging from about 1,000 to about 1,300° C.

In the general practice for carrying out the invention for obtaining the improved non-gassing separators hereof, a mixture of suitable magnesium-bearing, zinc-bearing or manganese-bearing, lead-bearing, and $SiO_2$-bearing materials is formed, generally in proportions by weight of the mixture, of about 0.3 to about 60% preferably about 10 to about 56%, magnesium or magnesium-bearing material or compound calculated as MgO, about 0.06 to about 72%, preferably about 2 to about 60%, of a substance selected from the group consisting of zinc or zinc-bearing material or compound calculated as ZnO, and manganese or manganese-bearing material or compound calculated as MnO, about 0.15 to about 70%, preferably about 0.2 to about 30%, lead or lead-bearing material or compound calculated as PbO, and about 10 to about 51%, preferably about 25 to about 42%, of $SiO_2$-bearing material, calculated as silica ($SiO_2$). It will be understood that the proportions of components employed can be varied to obtain the desired separator structure in terms of strength, porosity and chemical composition.

Suitable magnesium-bearing materials or magnesium compounds which can be employed are, for example, magnesium carbonate, magnesium sulfate, magnesium nitrate, magnesium chloride, magnesium silicate, magnesium oxide and hydroxide, and the naturally occurring minerals talc, enstatite, magnesite and forsterite.

Suitable manganese-bearing materials or manganese compounds which can be employed include, for example, manganese carbonate, manganese nitrate, manganese monoxide, manganese dioxide, either synthetic or in the form of the high purity grade "pyrolusite," which is the natural manganese dioxide, manganese sulfate, and manganese chloride.

As sources for suitable zinc-bearing materials or zinc compounds which can be employed are included zinc oxide, zinc carbonate, or soluble zinc salts such as zinc sulfate, zinc chloride, zinc nitrate, or zinc acetate. Also, the source of zinc can be a mineral species of zinc silicate, or such mineral also providing some lead together with the zinc, with due compensation being made for the amount of both lead and silica, with respect to the main sources of lead and silica noted below.

As source for the lead, or lead-bearing material or compound, there can be employed lead acetate, lead dioxide, white lead, red lead, litharge, lead hydroxide, tribasic lead silicate, lead sulfate, lead powder, basic lead acetate (also known as lead subacetate) and lead nitrate. Even lead sulfide (galena) may be used during the initial or oxidizing firing. Natural minerals such as cerrusite ($PbCO_3$), anglesite ($PbSO_4$), and the like, also can be used, if desired.

As a source of suitable $SiO_2$-bearing material, there can be employed for example, flint, silica, sand, diatomaceous earth or magnesium silicate, silica gel, silicic acid, fume silica, and the like.

In preferred practice for producing the non-gassing separator when in contact with zinc according to the invention, the content of impurities in the form of metals such as iron, nickel and cobalt in the above noted source materials should be low since such metals when present in the final separator produce low hydrogen overvoltages when in contact with zinc. Thus, it is preferred that the source materials be substantially free of iron, nickel and cobalt, and contain very little, if any, of such metals, preferably not in excess of about 1% calculated as FeO, total of such metals by weight of the total inorganics content of the starting mixture. However, in certain instances larger amounts of such metals can be tolerated, but are not preferred.

The starting mixture of magnesium-bearing, zinc-bearing or manganese-bearing, and lead-bearing materials, e.g., in the form of their oxides, and silica-bearing material, such as silica, can be produced, by mixing and ball-milling the requisite amount or proportions of these materials as noted above, until the mixture preferably is reduced to relatively small particle size, e.g., 5 microns or less. Larger particle size of the mixture of components can be employed, but under these conditions, higher firing temperatures and/or longer reaction times are generally required.

To the above mixture of starting materials, preferably of fine particle size, there can be added a small amount, e.g., about 0.1 to about 15%, preferably about 2 to about 10%, of an organic binder, by weight of total inorganics, such as a polyethylene glycol, e.g., Carbowax, beeswax, paraffin wax or whale wax, generaly dissolved in a suitable solvent such as acetone or toluene, and the resulting mixture dried, e.g., at ambient temperature or at elevated temperature to remove solvent. Although the addition of an organic binder is not necessary, it is preferred to employ such binder in order to provide adequate "green strength" for handling the mixture.

The resulting mass is then pressed into blocks at pressures of about 2,000 to about 40,000 p.s.i., the presence of the binder aiding in this operation. Where a binder is present, such blocks are then fired first in air at temperature of the order of about 400 to about 600° C. for a period of about 15 minutes to about 4 hours, to remove the organic binder. The blocks are then fired at temperature of the order of about 1,100° C. to about 1,400° C. The latter firing operation is generally carried out for a period of about 1 to about 20 hours.

It is preferred to carry out the latter firing operation for converting the initial starting components to the magnesium silicate-manganese silicate composition containing combined lead, or to the magnesium silicate-zinc silicate composition containing combined lead, at the upper portion of the latter temperature range, that is at between about 1,300 to about 1,400° C., in order to obtain complete reaction. Otherwise, when employing initial firing temperatures ranging between about 1,100° C. and below about 1,300° C., for 8 hours or less, a second reaction firing may be necessary to obtain adequate reaction to yield the above noted compositions.

In order to avoid or minimize lead loss during the above firing operation, the mixture of components preferably, although not necessarily, is fired in crucibles covered with a well-fitting cover. This assembly is then placed in a larger crucible, also containing a portion of the same charge or mixture in the annulus between the crucibles, and also fitted with a cover. The material in the annulus provides a balancing of the lead vapor pressure to minimize loss from the inner crucible.

Such initial firing operation causes reaction between the various components of the mixture, that is between the magnesium-bearing, the zinc-bearing or manganese-bearing, lead-bearing, and silica materials, to convert the mixture into a magnesium silicate-zinc silicate or magnesium silicate-manganese silicate, composition, in each case containing the lead component in combined form. The lead component according to the present information is also believed to be in the form of a lead silicate. Thus, during such initial firing operation the various components are converted to the oxides and then by reaction forming with the silica component, the magnesium-zinc-lead silicate or the magnesium-manganese-lead silicate of the following general formulae:

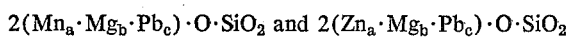

The values for the *a*, *b*, and *c* subscripts of the above formulae vary depending on the relative proportions of the magnesium-bearing material, zinc-bearing or manganese-bearing material, lead-bearing material, and silica-bearing-material employed.

An alternative modification makes use of all of the components of the starting mixture except the lead-bearing material and such mixture is first reacted at high temperature of about 1,300 to about 1,500° C., the fired mixture reground to fine particle size, the lead-bearing material or compound then added, and the resulting mixture refired at lower temperature, e.g., 1,150 to 1,250° C. for 2 to 16 hours, thereby minimizing lead loss.

The resulting initially fired pressed blocks, following cooling thereof, are granulated or pulverized, and ground to fine particle size, e.g., below about 5 microns, preferably although not necessarily, again mixed with fugitive organic binders of the type noted above and in the above noted amounts, and the mixture granulated, e.g., by pressing granulation, as through a screen, and the resulting powder is then pressed into blocks or plaques at pressures, e.g., ranging from about 2,000 to about 40,000 p.s.i., preferably about 5,000 to about 20,000 p.s.i., and, when employing such binders, are fired first at temperature of the order of about 400 to about 600° C. for a period of about 15 minutes to about 4 hours, to remove the organic binder. The pressed plaques are then sintered at temperatures of the order of about 1,000 to about 1,300° C. preferably about 1,100 to about 1,250° C., for a period of from about 5 minutes to about 8 hours, to form the magnesium silicate-zinc silicate, combined lead composition or the magnesium silicate-manganese silicate, combined lead composition, into the desired structure, that is in the form of porous members or membranes having the required characteristics of strength, alkali resistance and resistivity, as noted above, for use as battery separators.

Various modifications of the procedure noted above can be followed without departing from the spirit of this invention. For example, the lead can be introduced as a soluble salt, as for example, lead nitrate, into a heavy water slurry of the other mixed components, e.g., as their oxides. Sufficient ammonia can then be added to precipitate all of the lead, even though a portion of such lead is precipitated by the residual alkalinity of the magnesia. The slurry can be dried, and processed as described above, since the residual ammonium nitrate will be eliminated in the initial firing operation. Likewise, either or both the zinc or manganese oxide, and the magnesium oxide can be replaced by soluble salts such as the nitrates. An advantage of the above noted precipitation procedure is the excellent intimacy of the resulting mixture as well as the resulting very fine particle size of the components, permitting reaction to be completed in reduced time periods and/or lower temperatures. The precipitant can be ammonium carbonate or ammonium hydroxide, in which case it is not necessary to filter out the residual salts prior to firing. However, precipitation can be carried out employing sodium hydroxide or sodium carbonate, with subsequent filtration and washing to remove residual sodium salts.

The resulting porous sintered separators are believed to be in the form of a solid solution of magnesium silicate, zinc silicate or manganese silicate, and the combined lead, believed to be lead silicate. Such separators have a composition ranging from about 1 to about 99 mol percent, preferably about 25 to about 98 mol percent magnesium silicate, about 0.1 to about 99, preferably about 2 to about 80 mol percent of a substance selected from the group consisting of zinc silicate and manganese silicate, and about 0.1 to about 50, preferably about 0.2 to about 25, mol percent lead silicate.

As will be pointed out more fully below, it has been found that the resulting separators not only possess the ability to eliminate gassing when associated or in contact with a zinc electrode in a battery, but also inhibit the slight tendency toward gassing of the zinc electrode itself, thereby permitting hermetic sealing of the battery and affording very long cycle life. In addition, such separators have low resistivity which can range from about 5 to about 50 ohm-cm., providing high electrical efficiency, relatively high transverse strength or modulus of rupture ranging from about 8,000 to about 18,000 p.s.i., a porosity corresponding to a water absorption ranging from about 5 to about 50%, preferably about 7 to about 25%, and having high resistance to alkali, both for the zinc silicate- as well as manganese silicate-containing separators of the invention. In addition to eliminating gassing when in contact with a zinc electrode, the separators of the invention inhibit formation of zinc dendrites when in contact with a zinc electrode in a battery, thereby further aiding in prolonging battery life. The separators produced according to the invention can have a thickness ranging from about .005 to about 0.050 inch, but it will be understood that separators according to the invention, of any desired thickness can be produced.

The magnesium silicate-zinc silicate-lead silicate or the magnesium silicate-manganese silicate-lead silicate separator material produced according to the invention and converted or granulated to a ground particulate form, can be employed as inorganic separator material used in flexible separators, generally comprised of such separator material in particulate form distributed uniformly in a polymeric organic binder.

These include, for example, the flexible separators described in the copending application, Ser. No. 676,224, filed Oct. 18, 1967 of F. C. Arrance et al., now abandoned, and consisting, for example, of a porous inorganic material, which can be the above noted improved separator material of the present invention in particulate form, and a minor portion of a water coagulable organic fluorocarbon polymer such as a vinylidene fluoride polymer, to bond the particles of the inorganic material.

Also, the above noted inorganic separator material produced according to the invention in particulate form can be employed as the inorganic material in the flexible separators described in the copending application, Ser. No. 676,223, filed Oct. 18, 1967, of F. C. Arrance, now Pat. No. 3,542,596, and consisting for example of a major portion of such inorganic material, e.g., the above noted magnesium silicate-manganese silicate-lead silicate separator material of the invention, a minor portion of potassium titanate, and a minor portion of a cured organic polymer such as polyphenylene oxide as bonding agent.

Further, the improved inorganic separator material of the present invention in particulate form can be applied in the copending application, Ser. No. 707,808, filed Feb. 23, 1968, of F. C. Arrance et al., now abandoned in favor of continuation application Ser. No. 154,218, filed June 17, 1971, disclosing an improved flexible porous separator, which can be box-shaped to provide a compartment for a battery electrode, produced by applying on a flexible porous substrate, such as flexible sheets or mats of various materials including potassium titanate paper, asbestos, alumino-silicate sheets, and the like, a film comprising a mixture of particulate separator material according to the invention, e.g., magnesium silicate-manganese silicate-lead silicate, and an organic polymeric bonding agent of various types, such as polyphenylene oxide, or a fluorocarbon polymer such as vinylidene fluoride polymer, bonding the particles of the inorganic material together with the bonding agent, and forming a porous substantially inorganic separator film on the flexible substrate.

Also, the improved separator material of the invention, in particulate form, can be employed as the inorganic material in producing the flexible microporous separator film described in copending application, Ser. No. 27,577, filed Apr. 13, 1970, by M. P. Strier and J. S. Smatko, which consists essentially of an organic polymer such as polytetrafluoroethylene, having particles of such inorganic material uniformly distributed in said film.

In addition, the inorganic separator material of the invention, in particulate form, can be employed for producing a flexible porous separator according to the principles of copending application, Ser. No. 829,573, filed June 2, 1969, of F. C. Arrance et al., now Pat. No. 3,625,770, by applying a mixture of such material and an organic polymeric bonding agent such as polyphenylene oxide to a flexible fuel cell asbestos matrix, previously impregnated with polyphenylene oxide.

The following are examples illustrating practice of the invention.

EXAMPLE 1

The following mixture of components is prepared:

| Components | Wt. percent | Wt./grams |
| --- | --- | --- |
| $MnO_2$ | 3.3 | 13 |
| $SiO_2$ (colloidal silica) | 22.6 | 90 |
| PbO | 8.5 | 33.5 |
| $MgCO_3$ | 65.6 | 260 |
| Total | 100.0 | 396.5 |

The finely divided starting components are dry-blended for one half hour to provide an intimate mixture. The mixture is then made into a thick paste with a warm hexane solution of paraffin wax, such that the wax content is about 4% of the weight of the inorganic materials (about 16 grams), and the paste is then dried to yield friable crumbs, which are broken up to pea-size particles or smaller. These are compressed in a die at 15,000 p.s.i. to yield blocks suitable for the reaction firing.

The blocks are placed in a crucible and covered with a snug-fitting cover. This crucible is next placed into a larger crucible, with the space between crucibles containing a mixture of about the same composition as that being fired. A well-fitting cover is placed over the larger crucible, and the assembly is fired in a gas-fired furnace for 4 hours at 1,330° C.

The cooled blocks are then crushed to about 16 mesh in a Bico pulverizer, followed by ball-milling in hexane for 50 hours. The product from the ball mill is filtered, and the damp cake is mixed with a solution of 13 grams paraffin wax dissolved in warm hexane (about 60 cc.) to form a thick paste, which is slowly dried while stirring. The resulting crumbs are granulated on sieves to yield a pressing granulation whose grains are in the range −60 mesh to +150 mesh.

This sieved powder is pressed into plaques at 8,000 p.s.i. and fired at 1,180° C. for 14 minutes in an electric furnace in air, to yield separators of about 0.026 inch thickness, having a porosity corresponding to a water absorption of 10.7%, an apparent density average of about 2.37 g./cc., a modulus of rupture of about 13,800 p.s.i., and a resistivity in 30% KOH of about 18 ohm-cm. average. The separators contain about 90 mol percent magnesium silicate, about 5 mol percent manganese silicate and about 5 mol percent lead silicate.

EXAMPLE 2

The following mixture of components is prepared:

| Components | Wt. percent | Wt./grams |
| --- | --- | --- |
| $SiO_2$ (silica flour) | 28.0 | 120 |
| $MnCO_3$ | 21.3 | 92 |
| $(PbCO_3)_2 \cdot Pb(OH)_2$ | 24.3 | 104 |
| MgO | 26.4 | 113 |
| Total | 100.0 | 429 |

The finely divided starting materials are dry-blended for ½ hour to provide an intimate mixture, followed by making the blend into a thick paste with a warm toluene solution of a binder blend comprising one third beeswax, plus one third naphthalene, plus one third paraffin wax to the extent of 5% of the weight of the inorganic materials (about 22 grams). The paste is dried in a draft while constantly mixing, to yield small dry crumbs.

The crumbs are pressed in a die at 20,000 p.s.i. to yield small blocks, suitable for the reaction firing. The blocks are fitted into the crucible arrangement described in Example 1, and fired in a gas-fired furnace at 1,295° C. for 2 hours, to yield a light-beige colored, porcelain-like product, which is pulverized in a Bico pulverizer to about 16 mesh size. This granular product is ball-milled in acetone for 60 hours, followed by filtration. The resulting damp cake is then made into a paste with 100 cc. of acetone containing 22 grams of Carbowax-4000.

The paste is dried in the manner described above for the starting mixture paste, to yield friable crumbs that are pressed through sieves to yield a pressing powder granulation between 60 mesh and 150 mesh. The powder is pressed into plaques at 10,000 p.s.i., and fired in an electric furnace in air, first for 15 minutes residence time at 400° C. to remove binder, and then at 1,050° C. for 12 minutes to yield plaques having a porosity corresponding to 11% water absorption, an average apparent density of 2.40 g./cc., a modulus of rupture of 14,200 p.s.i., and an average resistivity in 30% KOH, of 16 ohm-cm.

Another group of the above plaques fired at 1,100° C. for 18 minutes yield plaques having a porosity corresponding to a water absorption of 8.6%, an average density of 2.58 g./cc., a modulus of rupture of 16,900 p.s.i., and a resistivity in 30% KOH, of about 26 ohm-cm.

The separator plaques contain about 70 mol percent magnesium silicate, about 20 mol percent manganese silicate and about 10 mol percent lead silicate.

EXAMPLE 3

The following mixture of components is prepared:

| Components | Wt. percent | Wt./grams |
| --- | --- | --- |
| Lead nitrate | 1.7 | 3.3 |
| Manganese nitrate (50% solution) | 34.5 | 72 |
| Cab-O-Sil (colloidal silica) | 28.8 | 60 |
| Magnesium oxide | 35.0 | 73 |
| Total | 100.0 | 208.3 |

The lead nitrate is made into a solution with a little water, and the solution is added to the manganese nitrate solution. Then the whole is diluted with two parts of water, whereupon the magnesium oxide and Cab-O-Sil are added under stirring to avoid lumping. Ammonium carbonate as an approximately 30% solution, is added slowly in sufficient amount, about 25 grams in 85 cc. water, with vigorous stirring to precipitate the lead and manganese as carbonates. After mixing for about an hour, the slurry is poured into Teflon-lined stainless steel pans and dried in an oven at about 100° C., until dry.

The dark-colored chips are then crumbled into fine grains which are further reduced in size in a mortar with a pestle. The powder is then spread out on polyethylene sheets to come to equilibrium with atmospheric moisture, for about 4 hours. Then the powder is pressed into blocks at 20,000 p.s.i. The blocks are fired in an electric furnace at 1,300° C. for 4 hours in a covered crucible.

After cooling, the blocks are crushed in a Bico Grinder to about 16 mesh, followed by ball-milling for 60 hours, in acetone. The slurry is filtered, and the damp cake is mixed with about 80 cc. of warm acetone containing 7.5 grams (about 5% by weight of total inorganics) of Carbowax-4000 to make a thick paste which is then dried while being stirred. The crumbs resulting therefrom are granulated through screens to yield a pressing granulation between 150 mesh and 60 mesh.

This classified powder is then pressed at 10,000 p.s.i. into thin plaques and fired at 1,200° C. for 15 minutes to yield separator plates approximately 25 mils thick, having a porosity corresponding to an average water absorption of 9.8% and an apparent density of 2.47 g./cc., an average modulus of rupture of 15,800 p.s.i. Resistivity in 30% KOH averages 20 ohm-cm. The separators contain about 89 mol percent magnesium silicate, about 10 mol percent manganese silicate and about 1 mol percent lead silicate.

EXAMPLE 4

The following mixture of components is prepared:

| Components | Wt. percent | Wt./grams |
|---|---|---|
| Lead nitrate | 2.2 | 5 |
| Zinc oxide | 10.8 | 25 |
| Magnesium oxide | 47.2 | 109 |
| Cab-O-Sil (colloidal silica) | 39.8 | 92 |
| Total | 100.0 | 231 |

The fine powders of zinc oxide, magnesium oxide and Cab-O-Sil are dry blended for one hour to get a uniform mixture. Then they are sifted into about 250 cc. of water containing the lead nitrate in solution, with thorough stirring. After mixing for ½ hour, the thick slurry is poured into Teflon-lined stainless steel pans and dried in an oven at 100° C. The dried chalky mass is crumbled, and mixed with 200 cc. of toluene containing 14 grams of paraffin wax dissolved therein (about 6% of the inorganic solids content) to form a thick paste which is dried at ambient temperature.

The crumbs are broken up into pea-sized particles and compressed into blocks at 20,000 p.s.i. These are fired in a gas-fired furnace in a covered crucible for 7 hours at 1,350° C. The hard, sintered mass is ground to 16 mesh in a Bico Pulverizer, followed by ball-milling for 55 hours in hexane. The finely ground mass is filtered, and the damp cake is mixed with 75 cc. of toluene containing 11 grams of paraffin wax (about 4% by weight of the total inorganic components), to form a thick paste, which is dried on a warm plate while being stirred until dry. The crumbs resulting from this are press sieved through sieves to yield a powder fraction between 150 mesh and 60 mesh.

Thin separator plaques are pressed from the powder, and are fired in an electric furnace at 1,220° C. for 14 minutes to yield separators with an average porosity corresponding to a water absorption of 0.2%, an apparent density of 2.52 g./cc., a modulus of rupture of 16,000 p.s.i., and a resistivity in 30% KOH of 21 ohm-cm. These separators contain about 89 mol percent magnesium silicate, about 10 mol percent zinc silicate and about 1 mol percent lead silicate.

EXAMPLE 5

The following mixture of components is prepared:

| Components | Wt. percent | Wt./grams |
|---|---|---|
| Talc | 46.5 | 190 |
| MgCO₃ | 42.5 | 174 |
| ZnO | 8.1 | 33 |
| Lead acetate trihydrate | 2.9 | 13 |
| Total | 100.0 | 410 |

The very finely ground talc, magnesium carbonate, and zinc oxide are dry mixed for ½ hour to obtain a homogeneous mixture. The lead acetate is dissolved in about ½ liter of water. Then the homogeneous mixture of dry components is slowly added to the lead acetate solution with stirring. After a smooth slurry is obtained, about 12 grams of ammonium hydroxide is slowly added, followed by continued mixing for ½ hour. Then the slurry is poured into a Teflon-lined stainless-steel pan, and dried at 100° C.

The chalky, lumpy crumbs are broken into rice-size pieces, and slurried to a paste by adding 220 cc. of toluene containing 20 grams (about 5% of the total inorganics) of a binder consisting of equal parts naphthalene, beeswax, and paraffin wax. The mass is dried, and the crumbs are pressed into blocks at 18,000 p.s.i., which are then fired at 1,330° C. for 5 hours. These are then ground in a Bico pulverizer to about 16 mesh, followed by ball-milling in heptane for 50 hours. The resultant mass is filtered, and the cake thereby obtained is made into a paste with about 130 cc. of warm toluene containing about 18 grams of Carbowax-4000 (about 5% of the total inorganics). The paste is dried in a current of ambient air, and the crumbs resulting therefrom are screened by pressing to yield a powder fraction between 150 mesh and 60 mesh.

Thin plaques are pressed from this powder, and are fired at 1,180° C. for 18 minutes in an electric furnace to yield plaques having an average porosity corresponding to a water absorption of 11.8%, an average apparent density of 2.36 g./cc., a modulus of rupture of 12,900 p.s.i., and a resistivity in 30% KOH of about 15 ohm-cm. The resulting separators contain about 89 mol percent magnesium silicate, about 10 mol percent zinc silicate and about 1 mol percent lead silicate.

EXAMPLE 6

The following mixture of components is prepared:

| Components | Wt. percent | Wt./grams |
|---|---|---|
| Magnesium trisilicate | 34.6 | 134 |
| Zn(NO₃)₂ · 6H₂O | 46.3 | 179 |
| White lead-(PbCO₃)₂ · Pb(OH)₂ | 13.4 | 52 |
| MgO | 5.7 | 22 |
| Total | 100.0 | 387 |

The magnesium trisilicate, white lead and magnesium oxide are dry blended for ½ hour, and then added in small increments to 350 cc. water containing the dissolved zinc nitrate, with vigorous stirring. Then 70 grams of ammonium carbonate dissolved in 150 cc. water is slowly added to precipitate the zinc. Mixing is continued for ½ hour with additions of acetone to keep the paste at a workable mixing consistency. Then the paste is poured into Teflon-lined stainless steel pans and dried in an oven at 70° C.

The dried chips are broken to sand grain size in a mortar and then spread out on a piece of plastic sheeting in a thin layer about 1/16 inch thick. A fine spray of water is atomized onto the grains until a weight gain of about 6% is achieved. Then the grains are stored in a plastic bag for 4 hours to homogeneously distribute the water.

The resulting conditioned powder is compressed into blocks at 15,000 p.s.i., and fired in a closed crucible in an electric furnace for 3 hours at 1,325° C. The cooled blocks are crushed in a Bico pulverizer to 16 mesh size, followed by ball-milling in acetone for 65 hours. The product is filtered, and the damp cake is mixed into a paste with 80 cc. toluene containing 10 grams of Carbowax-4000. The paste is dried while being mixed, and the resulting crumbs are sieved to obtain a pressing powder fraction between 150 mesh and 60 mesh.

The resulting powder is pressed into plaques, which are fired in an electric furnace at 1,180° C. for 13 minutes to yield separators of about 26 mils thickness. The average porosity corresponds to a water absorption of 12.2%, average density is about 2.35 g./cc., modulus of rupture about 12,100 p.s.i., and resistivity in 30% KOH is about 13 ohm-cm. The resulting separators contain about 60 mol percent magnesium silicate, about 30 mol percent zinc silicate, and about 10 mol percent lead silicate.

EXAMPLE 7

Balsam Gap natural olivine having the composition 47–49% MgO, 7–9% FeO and 30–41% $SiO_2$, prefired and processed into magnesium silicate-iron silicate separator material substantially according to the procedure described in the above patent, 3,446,668, by firing the Balsam Gap olivine at a temperature of about 1,300° C., is pulverized and designated material (A). A portion of this mixture is compacted at about 8,000 p.s.i. to flat members and such members are subjected to refiring in air at 1,100 C. for 6 hours. Following such firing, the samples are granulated. Such fired mixture is designated material (B).

The above noted prefired mixture (A) according to the above patent, refired mixture (B), a mixture of magnesium silicate-zinc silicate composition containing 90 mol percent magnesium silicate and 10 mol percent zinc silicate of Example 3 of my copending application, Ser. No. 89,865, filed Nov. 16, 1970, entitled Substantially Non-Gassing Alkali Resistant Battery Separator and Method of Producing Same, and designated material ($C_1$), a mixture of magnesium silicate-manganese silicate composition containing 90 mol percent magnesium silicate and 10 mol percent manganese silicate of Example 2 of my copending application, Ser. No. 83,315, filed Oct. 23, 1970, entitled Substantially Non-Gassing Alkali Resistant Battery Separator and Method of Production, granulated in particulate form and designated material ($C_2$), the magnesium silicate-zinc silicate-lead silicate material of Example 4 thereof, granulated and in particulate form, and designated material (D), and the magnesium silicate-manganese silicate-lead silicate composition of Example 3 hereof, granulated and in particulate form and designated material (E), are respectively mixed with 68.4% zinc powder by weight of the mixture, and the respective mixtures compressed at about 18,000 p.s.i. into pellets, and such pellets contacted under the same conditions with 30% KOH solution at ambient temperature. Further, a zinc blank is pelleted in the same manner and contacted with the same concentration KOH solution. The gas produced in each test is collected and measured with respect to time.

The materials tested and the amount of gas collected at various specified times from the reaction of the respective pellets contacted with the KOH solution, are set forth in the table below:

cate-manganese silicate material ($C_2$) of my above copending applications (Tests $3_1$ and $3_2$), in the presence of the zinc in alkali. Thus, it is noted that the gassing rates for the magnesium silicate-zinc silicate-lead silicate material (D) according to the present invention (Test 4), at the end of 6 hours, 24 hours and 48 hours is only 0.3, 0.7 and 0.9 cc., with comparable low gassing rates at these corresponding times for the magnesium silicate-manganese silicate-lead silicate material (E) of the present invention (Test 5), as compared for example, to 220, 431 and 559 cc., respectively (Test 1), for the olivine (magnesium silicate-iron silicate) material (A) produced according to the above patent, and which is not refired. Even greater gassing is produced when material (A) of the above patent is refired, material (B) according to Test 2 of the table.

Of particular significance, it is seen that the separators of the present invention as represented by materials (D) and (E) of the above table, not only eliminate gassing when in contact with the zinc, but actually inhibit the normally slight gassing tendency of zinc itself, as noted by a comparison of the gassing rates for materials (D) and (E) in Tests 4 and 5, with the gassing rates for the zinc blank (Test 6) at the end of 6 hours, 24 and 48 hours. It is noted that these values for the zinc blank are 0.3, 1.5 and 3.0 cc., respectively, which are substantially higher than the corresponding values at the end of 6 hours, 24 and 48 hours, for materials (D) and (E) in Tests 4 and 5, respectively.

EXAMPLE 8

The sintered separator plaques of Example 4 are ground, ball-milled and dried. 80 parts by weight of such separator material are mixed into a solution containing, by weight, 10 parts polyphenylene oxide, 10 parts polypropylene polyazelate, marketed as Plastolein 9750 by Emery Industries, Inc., dissolved in approximately 93 parts chloroform. This mixture is ball-milled 16 hours to form a smooth product of paint-like consistency. It is coated on 10 mil-thick fuel cell asbestos sheets, previously dipped in a 2% polyphenylene oxide polymer solution in chloroform and dried. The liquid coating is adjusted to form a dried film about 5 mils thick. The sheets so prepared after drying are flexible separators suitable for high energy density batteries, and having the non-gassing characteristics in the presence of zinc and alkali, of the magnesium silicate-zinc silicate-lead silicate separators of the invention.

EXAMPLE 9

The sintered magnesium silicate-manganese silicate-lead silicate separators produced in Example 3 are ground and ball-milled to fine particle size.

TABLE

| Test number | Starting material | Gas collected | | | | |
|---|---|---|---|---|---|---|
| | | 1 hr. | 2 hrs. | 6 hrs. | 24 hrs. | 48 hrs. |
| 1 | Balsam gap olivine prefired (A) | 66 | 108 | 220 | 431 | 559 |
| 2 | Prefired balsam gap olivine refired (B) | 87 | 139 | 260 | 522 | |
| $3_1$ | Magnesium silicate-zinc silicate ($C_1$) | 0.0 | 0.0 | 0.6 | 1.5 | 3.5 |
| $3_2$ | Magnesium silicate-manganese silicate ($C_2$) | 0.0 | 0.0 | 0.8 | 1.6 | 3.5 |
| 4 | Magnesium silicate-zinc silicate-lead silicate (D). | 0.0 | 0.0 | 0.3 | 0.7 | 0.9 |
| 5 | Magnesium silicate-manganese silicate-lead silicate (E). | 0.0 | 0.0 | 0.3 | 0.9 | 1.0 |
| 6 | Zinc blank | 0.0 | 0.0 | 0.3 | 1.5 | 3.0 |

Results from the above table show essentially complete elimination of gassing for the magnesium silicate-zinc silicate-lead silicate material (Test 4) and the magnesium silicate-manganese silicate-lead silicate material (Test 5), as compared to the Balsam Gap olivine prefired material (A) produced according to the above patent, and which is not refired (Test 1), or the same material which is refired (B) in air (Test 2), or the magnesium silicate-zinc silicate separator material ($C_1$) or the magnesium sili- The material is then processed according to Example 1 of the above copending application, Ser. No. 26,577, to produce a non-gassing separator in the following manner. An amount of 335 grams of such fine particle size magnesium silicate-manganese silicate-lead silicate composition is suspended in 225 grams water to form a 60% suspension by weight. An amount of 237.4 grams of Du Pont T–30B TFE aqueous emulsion of polytetrafluoroethylene (60.4% solids content) is added slowly to the magnesium silicate-manganese silicate-lead silicate dispersion.

After about 20 to 30 minutes of stirring, the resulting homogeneous slurry or aqueous dispersion is poured on a Pyrex glass plate, and is drawn down by means of a doctor blade set at 0.038 (15 mils). The resulting film is dried initially for about 15 minutes in the draft of a laboratory hood at about 70° F., and further dried at ambient room temperature for 15 hours. The dried film is then sintered at 360° C. for 20 minutes. About 12 grams of glycerine is added to the slurry prior to casting, per 100 ml. of such mixture, to improve film properties and prevent cracking during the following sintering operation.

The resulting sintered film formed of about 70% magnesium silicate-manganese silicate-zinc silicate and about 30% polytetrafluoroethylene, is highly flexible, has uniform distribution of the inorganic particles, and has good stability in aqueous KOH solution at 50 to 100° C.

EXAMPLE 10

Another batch of powder is prepared according to the procedure in Example 6 up to the point of filtering the ball-milled material. The cake is dried at this point without addition of the Carbowax. 140 grams of the resulting powder is put into suspension in 112 grams of water containing 6 grams of glycerin. Then 78 grams of Du Pont T-30B aqueous polytetrafluoroethylene emulsion is added with mild stirring to avoid foam. This provides a ratio of the magnesium-zinc-lead silicate to polytetrafluoroethylene solids of 75 to 25.

The suspension is cast on a glass plate, and drawn down with a doctor blade to about 15 mils thickness. The film is dried in the ambient air for 15 hours, and then sintered at 360° C. for 20 minutes. The film is stripped from the plate and has a thickness of about 2.5 mils, is highly flexible with a very uniform distribution of the particles. It has an average pore size of about 0.3 micron and an initial resistivity of about 55 ohm-cm. which drops to about 6.8 ohm-cm. after conditioning first in alcoholic KOH and then in 30% aqueous KOH.

EXAMPLE 11

Referring to the accompanying illustrative drawing, the separators produced according to Example 3 are assembled in three batteries of the type indicated at 10, such battery being a three electrode battery consisting of two silver electrodes 12 and one zinc electrode 14, with the zinc electrode sandwiched between two of the magnesium silicate-manganese silicate-lead silicate separators 16 produced according to the Example 3 above, one separator opposite each face of the zinc electrode, such separators contacting the adjacent silver electrodes. The two silver electrodes are connected via leads 18 to a battery terminal 20, and the zinc electrode is connected via a lead 22 to the battery terminal 24. The battery is filled with 30% KOH.

The above three batteries having the above described construction are tested using a cycling regime of one hour discharge and three hours charge per cycle, to 50% depth of discharge. One of these batteries has accumulated in excess of 1,300 such cycles, the second battery in excess of 1,200 cycles, and the third has accumulated in excess of 1,180 cycles, without any material loss of capacity.

EXAMPLE 12

The procedure of Example 11 is repeated employing in place of the separators produced in Example 3, magnesium silicate-zinc silicate-lead silicate separators produced according to Example 5 above.

Using the test cycling regime described in Example 11, one of the batteries tested accumulates 930 charge-discharge cycles, a second test battery accumulates about 1,700 cycles and the third battery about 1,400 such cycles, the above batteries declining only slightly in capacity during these periods, and such batteries continue to cycle without any evidence of zinc dendrite formation.

It will be understood that in the starting mixture there can be employed instead of zinc-bearing material or manganese-bearing material separately, a mixture of such materials, generally within the range of proportions of such materials noted above, that is, about 0.06 to about 72%, calculated as their oxides, by weight. Under these conditions, the resulting separators will contain a combination of zinc silicate and manganese silicate generally within the mol proportions noted above for such components, that is, about 0.1 to about 99 mol percent.

The following example is illustrative of the above modification.

EXAMPLE 13

The procedure of Example 4 is followed except that in place of the 25 grams of zinc oxide, there is employed 12 grams of zinc oxide and 13 grams of manganese dioxide.

The separators thus produced contain about 89 mol percent magnesium silicate, about 5 mol percent zinc silicate, about 5 mol percent manganese silicate and about 1 mol percent lead silicate, and have properties similar to those of the separators produced according to Example 4.

Although the improved magnesium silicate-manganese silicate-lead silicate, magnesium silicate-zinc silicate-lead silicate and magnesium silicate-zinc silicate-manganese silicate-lead silicate separators produced according to the invention are particularly advantageous when employed with a zinc electrode to eliminate gassing tendency as compared to the magnesium silicate-iron silicate separator of the above patent, 3,446,668, it will be noted that the improved separators of the present invention can also be utilized in high energy density batteries containing electrodes other than zinc electrodes, for example, in a nickel-cadmium or silver-cadmium battery, with advantageous results in providing reduction of dendrite growth on prolonged cycling.

In view of the foregoing, it is seen that the invention provides procedure for producing non-gassing efficient separators, providing superior performance when employed in a battery with a zinc electrode, and permitting the provision of hermetically sealed long lived secondary batteries, such as efficient sealed silver-zinc and silver-cadmium batteries. Also the separators of the invention have good transverse strength, low resistivity, inhibiting effect on zinc dendrite formation, and high alkali resistance.

While I have described particular embodiments of the invention for purposes of illustration, it will be understood that various changes and modifications can be made therein within the spirit of the invention, and the invention accordingly is not to be taken as limited except by the scope of the appended claims.

I claim:

1. A non-gassing battery separator when employed with a zinc electrode, and having high strength and good resistance to alkali, in the form of a porous member having a composition consisting essentially of sintered particles of a solid solution of about 1 to about 99 mol percent magnesium silicate, about 0.1 to about 99 mol percent of a substance selected from the group consisting of zinc silicate, manganese silicate, and combinations thereof, and about 0.1 to about 50 mol percent lead silicate.

2. A battery separator as defined in claim 1, said separator having a porosity corresponding to a water absorption ranging from about 5% to about 50%.

3. A battery separator as defined in claim 2, wherein said composition consists essentially of sintered particles of a solid solution of about 25 to about 98 mol percent magnesium silicate, about 2 to about 80 mol percent of said substance and about 0.2 to about 25 mol percent lead silicate.

4. A battery separator as defined in claim 3, said separator having a modulus of rupture ranging from about 8,000 to about 18,000 p.s.i. and a resistivity ranging from about 5 to about 50 ohm-cm.

5. A battery separator as defined in claim 2, said substance being manganese silicate.

6. A flexible battery separator as defined in claim 1, a major proportion of said sintered composition in particulate form being distributed uniformly in a minor proportion of polymeric organic binder.

7. A flexible battery separator as defined in claim 2, a major proportion of said sintered composition in particulate form being distributed uniformly in a minor proportion of polymeric organic binder.

8. A flexible battery separator as defined in claim 2, said sintered composition in particulate form being distributed uniformly in a polymeric organic binder selected from the group consisting of polyphenylene oxide and polytetrafluoroethylene.

9. In a battery containing a zinc electrode, a non-gassing battery separator as defined in claim 1.

10. In a battery as defined in claim 9, said zinc electrode being positioned on one side of said separator and including a silver electrode positioned on the opposite side of said separator.

11. In a battery containing a zinc electrode, a separator as defined in claim 2, said zinc electrode being positioned on one side of said separator and including a silver electrode positioned on the opposite side of said separator.

12. In a battery containing a zinc electrode, a separator as defined in claim 3, said zinc electrode being positioned on one side of said separator and including a silver electrode positioned on the opposite side of said separator.

13. A battery separator as defined in claim 1, wherein said substance is a combination of zinc silicate and manganese silicate.

14. A battery separator as defined in claim 2, wherein said substance is a combination of zinc silicate and manganese silicate.

15. A process of producing a non-gassing separator when employed with a zinc electrode, and having high strength and good resistance to alkali, which comprises compacting a mixture of about 0.3 to about 60% magnesium-bearing material calculated as MgO, about 0.06 to about 72% of a substance selected from the group consisting of zinc-bearing material calculated as ZnO, manganese-bearing material calculated as MnO, and mixtures thereof about 0.15 to about 70% of a lead-bearing material calculated as PbO, and about 10 to about 51% silica, by weight, initially firing said compacted mixture at a temperature in the range of about 1100 to about 1400° C., granulating the resulting fired composition, compacting said granulated composition, and sintering said last mentioned compacted composition at a temperature ranging from about 1000 to about 1300° C., to produce said separator.

16. The process as defined in claim 15, said composition containing about 10 to about 56% magnesium calculated as MgO, about 2 to about 60% of a substance selected from the group consisting of zinc calculated as ZnO, manganese calculated as MnO, and mixtures thereof, about 0.2 to about 30% lead calculated as PbO and about 25 to about 42% silica, by weight.

17. The process as defined in claim 15, including incorporating an organic binder in said mixture prior to said sintering.

18. The process as defined in claim 15, including adding about 0.1 to about 15% of an organic binder by weight of total inorganics, to said mixture and compacting said mixture prior to said initial firing at about 1,100 to about 1,400° C., and including incorporating about 0.1 to about 15% of an organic binder by weight of total inorganics, in said compacted composition prior to said subsequent sintering from about 1,000 to about 1,300° C.

19. The process as defined in claim 18, including pressing said mixture into blocks prior to said initial firing, granulating said blocks following said initial firing, incorporating said organic binder in the resulting granular composition and pressing said last mentioned mixture into plaques, followed by said sintering said plaques at a temperature ranging from about 1,000 to about 1,300° C.

20. The process as defined in claim 19, said starting mixture consisting essentially of about 10 to about 56% magnesium-bearing material calculated as MgO, about 2 to about 60% of a substance selected from the group consisting of zinc-bearing material calculated as ZnO, manganese-bearing material calculated as MnO, and mixtures thereof, about 0.2 to about 30% of a lead-bearing material calculated as PbO, and about 25 to about 42% silica, by weight.

References Cited
UNITED STATES PATENTS 3,446,668    5/1969    Arrance et al.    106—60 X WINSTON A. DOUGLAS, Primary Examiner H. A. FEELEY, Assistant Examiner U.S. Cl. X.R.

136—146, 148, 30